United States Patent [19]

Muto

[11] Patent Number: 5,113,415

[45] Date of Patent: May 12, 1992

[54] DETECTION OF A PARTICULAR SIGNAL SEQUENCE WITH NO ADVERSE INFLUENCE OF MULTIPATH TRANSMISSION

[75] Inventor: Hiroyasu Muto, Tokyo, Japan

[73] Assignee: NEC Corporation, Tokyo, Japan

[21] Appl. No.: 541,690

[22] Filed: Jun. 21, 1990

[30] Foreign Application Priority Data

Jun. 21, 1989 [JP] Japan .................................. 1-156856
Jun. 21, 1989 [JP] Japan .................................. 1-156857

[51] Int. Cl.$^5$ ............................................. H04L 7/04
[52] U.S. Cl. ................................... 375/83; 375/116
[58] Field of Search ................... 364/715.11; 375/82, 375/83, 114, 116; 370/93, 953, 105.4, 106; 455/38

[56] References Cited

U.S. PATENT DOCUMENTS 3,825,691  7/1974  Honma et al. ................... 370/93
4,510,579  4/1985  Nossen ........................ 364/715.11

Primary Examiner—Benedict V. Safourek
Attorney, Agent, or Firm—Sughrue, Mion, Zinn, Macpeak & Seas

[57] ABSTRACT

A particular signal sequence corresponding in a received signal to a symbol pattern consisting of a predetermined number of symbols at a symbol interval, is detected by sampling (45-48) into phase samples substantially at the symbol interval of a phase of a signal vector obtained by coherent detection (11) of the received signal, calculation (51-52) of phase differences, each between two consecutive phase differences, detection (56-57) of consecutive instances of coincidence of each phase difference substantially with a predetermined phase difference, and determination (58-60) of presence of the signal sequence in the received signal when the instances of coincidence substantially reach in number to the predetermined number. Preferably, the sampling is carried out my making (11) I and Q signals represent the phase and converting (46-48) and I and Q signals to the phase samples by using a clock generator (45). When produced (46-47), I and Q digital signals represent their amplitudes, which are subjected to conversion (48) into the phase samples. The conversion, calculation, detection, and determination can be processed by a digital signal processor.

15 Claims, 4 Drawing Sheets

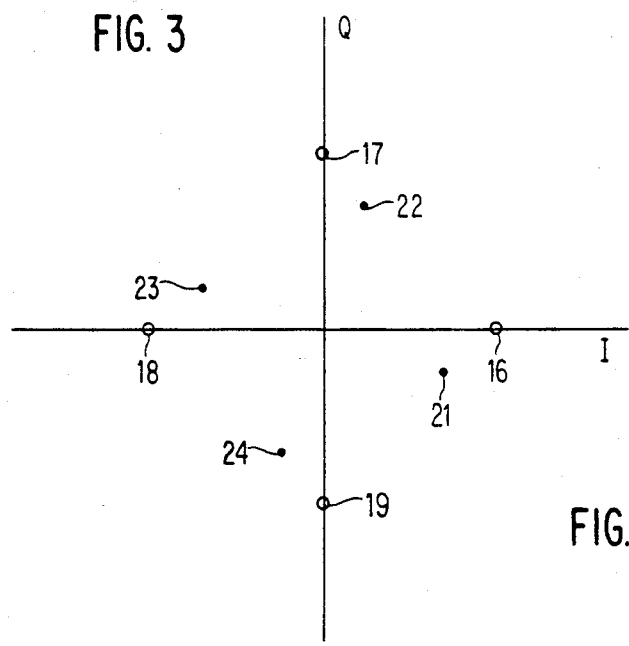
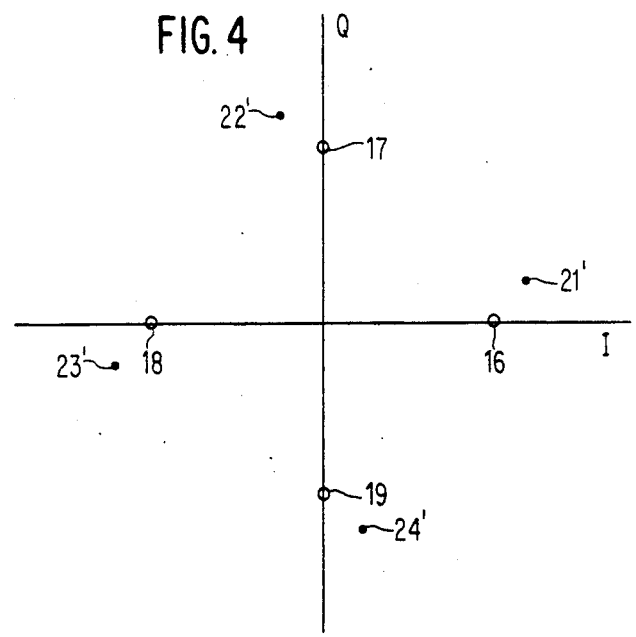
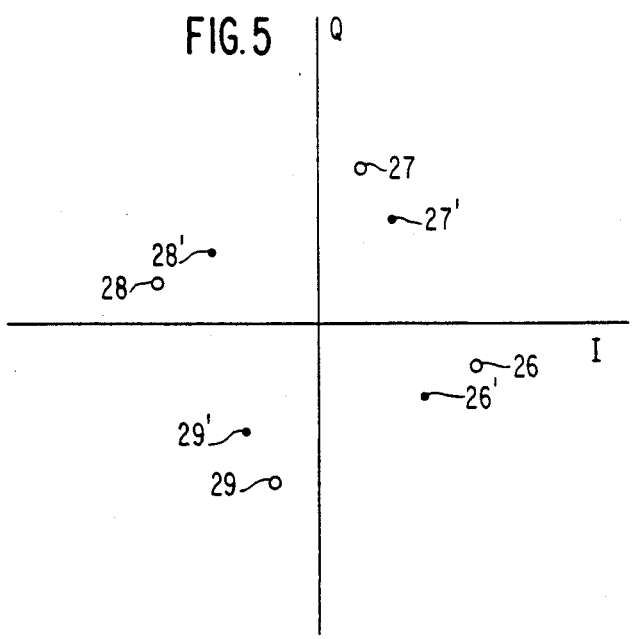

DETECTION OF A PARTICULAR SIGNAL SEQUENCE WITH NO ADVERSE INFLUENCE OF MULTIPATH TRANSMISSION

BACKGROUND OF THE INVENTION

This invention relates to detection of a particular signal sequence in a received signal which is produced by angular modulation of a modulating signal comprising symbols representative of binary one and zero at a predetermined symbol interval. The particular signal sequence is given by subjecting to the angular modulation a particular symbol pattern which the modulating signal comprises and which consists of a predetermined number of symbols in a predetermined manner. Typically, the particular symbol pattern is a preamble which precedes an information signal of the modulating signal and is used in time division multiple access (TDMA) communication.

It will be assumed for the time being that detection of the particular signal sequence is used in a time division multiple access radio communication network. In other words, a method or a device for detecting the particular signal sequence is used in a receiver included in the network. The particular symbol pattern is preliminarily known by an attendant to the receiver.

Inasmuch as the received signal is subjected to the angular modulation, the receiver comprises a coherent detector for subjecting the received signal to coherent demodulation or detection to produce inphase (I) and quadrature phase (Q) analog signals. It is possible to understand that the inphase and the quadrature phase analog signals are cooperative to define a signal vector on a phase plane defined by orthogonal I or real and Q or imaginary axes. The signal vector has a phase which is variable in accordance with the modulating signal. The coherent detection therefore produces in short the signal vector or a vector signal representative of the signal vector.

According to prior art, the particular signal sequence is detected by using the inphase and the quadrature phase analog signal in regenerating a clock signal of a clock period which should be equal to the symbol interval. The clock signal is used in determining a time instant of discrimination of the particular symbol pattern. Before detection of the particular signal sequence, such time instants are used in regenerating a regenerated datum from the inphase and the quadrature phase analog signals. If the regenerated datum includes a portion coincident with the particular symbol pattern, it is known that the received signal includes the particular signal sequence.

When the particular signal sequence should be detected in the radio communication network, the received signal is inevitably subjected to multipath or multi-path transmission which gives rise to intersymbol interference in the regenerated datum. This brings forth an adverse influence on the regenerated datum and consequently adversely affects adequate detection of the particular signal sequence.

It is known in the art to use transmission path equalization in order to get rid of the adverse influence and thereby to enable correct regeneration of the datum and correct detection of the particular signal sequence. A considerably long time is, however, necessary to detect the particular symbol pattern and the particular signal sequence when the transmission path equalization is resorted to. This is objectionable particularly in high-speed digital communication.

Even when the particular signal sequence should be detected in a wired or an optical communication network, the clock signal may not always be regenerated with a correct clock period. In this event, it becomes impossible to correctly obtain the regenerated datum. As a consequence, the particular signal sequence can not adequately be detected.

SUMMARY OF THE INVENTION

It is therefore an object of the present invention to provide a method and a device for correctly detecting a particular signal sequence in a received signal with no adverse influence of multipath transmission when the received signal is received through a radio channel.

It is another object of this invention to provide a method and a device of the type described, in which transmission path equalization is unnecessary.

It is still another object of this invention to provide a method and a device for correctly detecting a particular signal sequence in a received signal without regeneration of a clock signal.

It is yet another object of this invention to provide a method and a device of the type described, for which it is unnecessary that a correct clock period should be had by a clock signal either used in the method or generated in the device.

Other objects of this invention will become clear as the description proceeds.

On describing the gist of an aspect of this invention, it is possible to understand that a method of detecting a particular signal sequence in a received signal is used when the received signal is produced by angular modulation of a modulating signal including symbols representative of binary one and zero at a predetermined symbol interval and comprising a particular symbol pattern of a predetermined number of symbols and when the particular signal sequence is the particular symbol pattern subjected to the angular modulation. The method is carried out by subjecting the received signal to coherent detection to produce a signal vector which has a phase variable in accordance with the modulating signal.

In accordance with this aspect of the invention, the above-understood method is carried out by (0) using a sampling interval substantially equal to the symbol interval and is characterised by the steps of: (1) sampling the phase at the sampling interval to produce phase samples; (2) calculating calculated phase differences at the sampling interval, each calculated phase difference between two consecutive ones of the phase samples; (3) detecting consecutive instances of coincidence of each of the calculated phase differences substantially with a predetermined phase difference; and (4) knowing presence of the particular signal sequence in the received signal when the instances of coincidence reach in number substantially to the predetermined number.

A little more in detail, the above-mentioned method is carried out by (A) subjecting the received signal to coherent detection to produce an inphase and a quadrature phase analog signal which are cooperative to define the signal vector. Using as the sampling interval a clock interval which is substantially equal to the symbol interval, the method is further carried out by (B) generating a clock signal at the clock interval; (C) converting in synchronism with the clock signal the inphase and the quadrature phase analog signals to first and second digital signals cooperative to represent the phase samples; and (D) the above-recited calculating, detecting, and knowing steps.

On describing the gist of a different aspect of this invention, it is possible to understand that a device for detecting a particular signal sequence in a received signal is used when the received signal is produced by angular modulation of a modulating signal including symbols representative of binary one and zero at a predetermined symbol interval and comprising a particular symbol pattern of a predetermined number of symbols and when the particular signal sequence is the particular symbol pattern subjected to the angular modulation. The device is connected to a coherent detector for subjecting the received signal to coherent demodulation to produce a vector signal representative of a signal vector having a phase variable in accordance with the modulating signal.

According to the different aspect of this invention, the above-understood device is operable by using a sampling interval substantially equal to the symbol interval and is characterised by: (1) sampling means supplied with the vector signal for sampling the phase at the sampling interval to produce a sample signal representative of phase samples; (2) calcualating means supplied with the sample signal for calculating calculated phase differences at the sampling interval, each calculated phase difference between two consecutive ones of the phase samples, to produce a difference signal representative of the calculated phase differences; (3) detecting means supplied with the difference signal for detecting consecutive instances of coincidence of each of the calculated phase differences substantially with a predetermined phase difference to produce a coincidence signal representative of the instances of coincidence; and (4) determining means supplied with the coincidence signal for determining presence of the particular signal sequence in the received signal when the instances of coincidence reach in number substantially to the predetermined number. The determining means thereby produces a result signal which indicates that the particular signal sequence is present in the received signal.

A little more in detail, the above-understood device comprises: (A) a coherent detector for subjecting the received signal to coherent demodulation to produce an inphase and a quadrature phase analog signal which are cooperative to define a signal vector having a phase variable in accordance with the modulating signal; (B) a clock generator for generating a clock signal at a clock interval which is substantially equal to the symbol interval; (C) converting means supplied with the clock signal for converting in synchronism with the clock signal the inphase and the quadrature phase analog signals to first and second digital signals cooperating to represent the above-mentioned phase samples; (D) calculating means supplied with the clock signal and the first and the second digital signals for calculating calculated phase differences at the clock interval, each calculated phase difference between two consecutive ones of the phase samples, to produce the above-mentioned difference signal; and (F) the above-recited detecting and determining means.

BRIEF DESCRIPTION OF THE DRAWING

FIG. 3 shows a phase plane for use in describing principles of the instant invention;

FIG. 4 shows another phase plane for use in describing the principles of this invention;

FIG. 5 shows still another phase plane for use in describing the principles of this invention;

DESCRIPTION OF THE PREFERRED EMBODIMENTS

Figure 1:
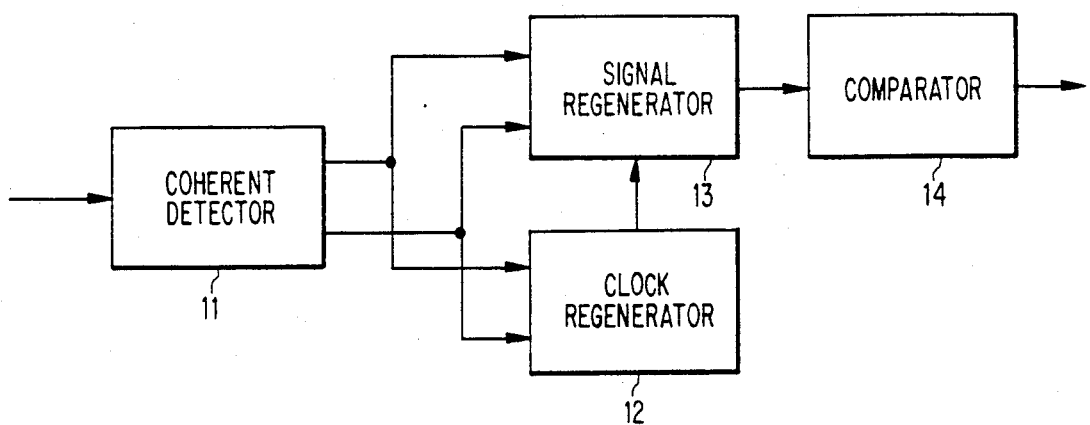
FIG. 1 is a block diagram of a conventional device for detecting a particular signal sequence.

Referring to FIG. 1, a conventional signal sequence detecting device will be described at first in order to facilitate an understanding of the present invention. The device is for detecting a particular signal sequence in a received signal when the received signal is produced by subjecting a carrier signal to angular modulation by a modulating signal which includes symbols representative of binary one and zero at a predetermined symbol interval T and comprises a particular symbol pattern consisting of a predetermined number N of symbols representative of the binary one and/or zero in a predetermined manner and when the particular signal sequence is produced by subjecting the particular symbol pattern to the angular modulation. Usually, an information signal immediately follows the particular symbol pattern in the modulating signal and carries information which should be transmitted and is represented by the symbols representative of the binary one and zero. Typically, the particular symbol pattern is a preamble used in a time division multiple access (TDMA) communication network to make a receiver of the network receive the received signal. At any rate, the particular symbol pattern is preliminarily known by an attendant to the receiver.

More particularly, the carrier signal has a phase which is varied a predetermined angle in first and second senses of a direction according to the angular modulation when each symbol represents the binary one and zero, respectively. The first and the second senses are opposite to each other. In this manner, the carrier signal is modulated by the modulating signal into a modulated signal. Transmitted through the network, such a modulated signal is received by the receiver as the received signal. It is therefore possible to say in short that the modulating signal is angularly modulated into the received signal.

The particular symbol pattern should consist of the symbols representative of a selected one of the binary one and zero when the modulating signal is subjected to either minimum phase shift keying (MSK) or Gaussian minimum shift keying (GMSK). If the modulated signal is subjected to tamed frequency modulation (FM), the particular symbol pattern may consist of three symbols representative of the binary one. A different symbol pattern immediately follows the particular symbol pattern as another particular symbol pattern and may consist of three symbols representative of the binary zero. Another symbol pattern immediately follows the different symbol pattern as still another particular symbol pattern and may consist of several symbols alternatingly representative of the binary one and zero.

In FIG. 1, the receiver comprises a coherent detector 11 for subjecting the received signal to coherent demodulation or detection to produce inphase (I) and quadrature phase (Q) analog signals. The device is connected to the coherent detector 11. As the case may be, it is possible to alternatively understand that the device comprises the coherent detector 11.

A clock regenerator is depicted at 12. Supplied with the inphase and the quadrature phase analog signals, the clock regenerator 12 regenerates a clock signal of a clock period or at a clock interval which should be equal to the symbol interval T. Using the clock signal, a signal regenerator 13 determines a time instant of discrimination of each symbol in a combination of the inphase and the quadrature phase analog signals and uses such time instants in regenerating the modulating signal as a regenerated datum from the combination. A comparator 14 is for comparing the regenerated datum with the particular symbol pattern or patterns. When a portion is found in the regenerated datum to coincide with the particular symbol pattern or patterns, it is known that the received signal includes the particular signal sequence or sequences.

On generally describing detection of the particular signal sequence, it will be presumed for the time being that the minimum phase shift keying is used in modulating the carrier signal of an angular frequency w(c) by the modulating signal into the modulated signal. It should be noted that the angular frequency of the carrier signal is herein denoted by using a double-u rather than the Greek omega minuscule. Having inphase and quadrature phase components $\cos\phi(t)$ and $\sin\phi(t)$, the modulated signal of a unit amplitude is represented by:

$$\cos\phi(t)\cdot\cos w(c)t + \sin\phi(t)\cdot\sin w(c)t.$$

It will be assumed that the communication network is a radio network. Due to multipath or multi-path transmission, the modulated signal may reach the receiver as the received signal through a plurality of paths. More in detail, the modulated signal may reach the receiver as a direct signal and additionally as a delayed signal. In other words, the received signal may be a "superposed" signal comprising the direct signal and the delayed signal which is superposed on the direct signal. When the delayed signal has a delay t' relative to the direct signal, the delayed signal is represented by:

$$A\cos\phi(t-t')\cdot\cos w(c)(t-t') + A\sin\phi(t-t')\cdot\sin w(c)(t-t'),$$

where A represents an amplitude ratio which the delayed signal has relative to the direct signal. The superposed signal is therefore represented by:

$$(\cos\phi(t) + A\cos[\phi(t-t') - w(c)t']) \times \cos w(c)t + (\sin\phi(t) + A\sin[\phi(t-t') - w(c)t']) \times \sin w(c)t, \quad (1)$$

It is understood from the foregoing that the inphase and the quadrature phase analog signals are cooperative to represent a signal vector on a phase plane defined by orthogonal I or real and Q or imaginary axes. The phase plane has an origin at a point of intersection of the I and the Q axes. The signal vector has a phase $\phi(t)$ which is variable in accordance with the modulating signal. The coherent detector 11 of FIG. 1 therefore produces the inphase and the quadrature phase analog signals collectively as a vector signal representative of the signal vector and consequently the phase.

Figure 2:
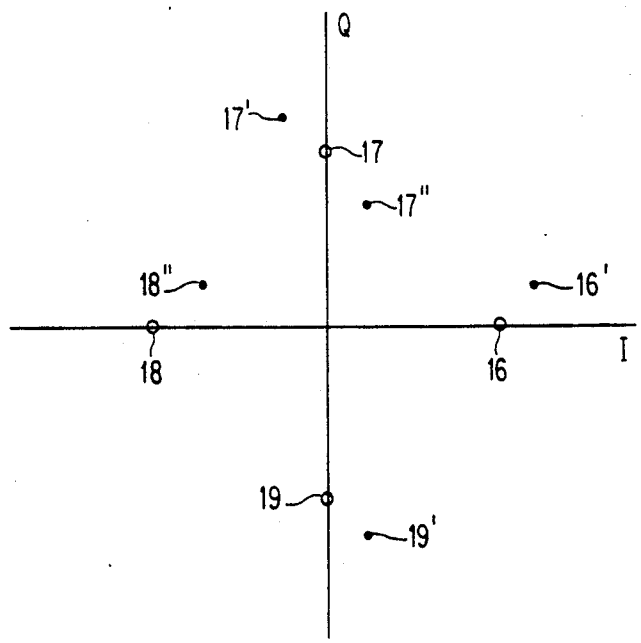
FIG. 2 shows a phase plane for use in generally describing detection of the particular signal sequence.

Turning to FIG. 2, the signal vector (not shown) is directed from the origin of a phase plane and rotates 90° per symbol interval T to have an end point on a locus of a unit circle (not shown) if the received signal is the direct signal alone. The phase $\phi(t)$ is represented by an angle which the signal vector forms with a positive part of the I axis. It will be assumed that the signal vector has a phase at a certain time instant as depicted by a small circle at a first point 16. The phase will be called a first phase with the time instant called a first time instant.

It is possible to understand without loss of generality that the signal vector rotates forward or counterclockwise and backward or clockwise when the symbols represent the binary one and zero in the modulating signal, respectively. Each symbol will be said to represent the binary one at a time instant when the symbol is kept at the binary one during one symbol interval from the time instant under consideration. This applies when each symbol represents the binary zero.

It will be surmised at first that the symbols represent the binary one at the first time instant and at second through fourth time instants which are one through three symbol intervals later than the first time instant. At the second through the fourth time instants, the phase of the signal vector becomes second through fourth phases illustrated by small circles at second through fourth points 17, 18, and 19. When the symbols represent binary double one, zero, one, and triple zero at the first through the fourth time instants and then fifth through seventh time instants which are four through six symbol intervals later than the first time instant, the phase varies from the first point 16 forward to the second and the third points 17 and 18, back to the second point 17, forward to the third point 18, and back to the second, the first, and the fourth points 17, 16, and 19. The fact is now understood that the first through the fourth points 16 to 19 represent phase samples which are sampled from the phase of the signal vector at a sampling interval which is equal to the symbol interval.

It will be surmised that the symbols represent binary double one, zero, one, and triple zero as above and that the received signal becomes at a time instant between the first and the second time instants a superposed signal consisting of the direct signal and a delayed signal which is superposed on the direct signal and has the delay t' of one symbol interval T and the amplitude ratio A of $$\sqrt{2}/2$$

with two factors $\cos c(w)t$ and $\sin c(w)t$ in Formula (1) rendered equal to $$\sqrt{2}/2 \text{ and } (-\sqrt{2}/2).$$

Under the circumstances, the phase of the signal vector is represented by the first point 16 at the first time instant. At the second through the seventh time instants, the phase in represented as depicted by dots at second and third backward points 17'' and 18'', a second forward point 17', the third backward point 18'', and the second forward point 17' and then first and fourth forward points 16' and 19'.

Such forward and backward points are calculated from Formula (1), where the delay t' is now equal to the symbol interval T. Merely for brevity of the description, the signal vector derived from the direct signal will be called a direct signal vector. The signal vector derived from the superposed signal will be called a superposed signal vector. When such a signal vector has an n-th phase, the signal vector will be called an n-th direct or superposed signal vector.

For exemple, the second backward point 17" will be taken into consideration. This point 17" represents a phase of a second superposed signal vector which is given by a sum of a second direct signal vector plus a product of the amplitude ratio A and a first direct signal vector given a rotation of w(c)T radian. An angle of w(c)T radian is therefore formed between a tangent to the locus of the unit circle at the second point 17 and a line defined by the second point 17 and the second backward point 17", which is inside the locus.

It is now clear, when the received signal is not the direct signal alone but is a superposed signal, that the receiver can not correctly regenerate the modulating signal when the receiver comprises the conventional device. As a result, the device can not adequately detect the particular symbol pattern in the regenerated datum and consequently the particular signal sequences in the received signal. This becomes serious particularly either when the delay t' becomes longer than the symbol interval or when the amplitude ratio A becomes great.

In the manner described heretobefore, use of transmission path equalization makes it possible to get rid of such an adverse influence caused by the multipath transmission on detection of the particular signal sequence. An appreciably long time is, however, necessary to detect the particular symbol pattern and the particular signal sequence. This is objectionable particularly in high-speed digital communication.

Even when the particular signal sequence should be detected in a wired or an optical communication network, the clock signal may not necessarily be regenerated with the clock interval rendered correctly equal to the symbol interval. This makes it impossible to correctly regenerate the modulating signal. As a consequence, the particular signal sequence is not adequately detected in the received signal.

Principles of the present invention will now be described before describing preferred embodiments of this invention. It will again be presumed that the carrier signal is modulated by the modulating signal according to the minimum phase shift keying. On referring to the phase samples or the phase, the syntagms "the direct signal", "the delayed signal", and "the superposed signal" will be used as above instead of the syntagm "the signal vector derived from" such a signal. In addition, it may be mentioned here that the phase samples may be sampled at a sampling interval which is not correctly equal to the symbol interval depending on the circumstances.

Referring to FIG. 3, the phase samples of the direct signal are depicted on a phase plane by small circles at first through fourth points 16 to 19 like in FIG. 2. First through fourth dots 21, 22, 23, and 24 correspond to the backward points, such as 17" and 18" in FIG. 2, and show the phase samples of the superposed signal described in conjunction with FIG. 2.

Turning to FIG. 4, the first through the fourth points 16 to 19 are again depicted on a phase plane by small circles in connection with the direct signal. First through fourth dots 21', 22', 23', and 24' correspond to the forward points, such as 16' and 17' in FIG. 2, and show the phase samples of the superposed signal described in connection with FIG. 2.

Observing FIGS. 3 and 4, it is understood that the phase samples move a predetermined angle 90° in a forward or counterclockwise sense and a backward or clockwise sense only when the symbols of the binary one and zero, respectively, continue a few symbol intervals in the modulating signal. When the symbols alternatingly represent the binary one and zero, the phase samples move between two consecutive points. In this event, the signal vector oscillatingly rotates on the phase plane.

Further turning to FIG. 5, it will be surmised that the sampling interval is a little different from the symbol interval T. In this case, the signal vector rotates on a phase plane with a speed which is a little different from the speed of rotation which the signal vector has when the sampling interval is correctly equal to the symbol interval T. The phase samples accordingly move along the locus of the unit circle. The phase samples of the direct signal, however, have first through fourth points 26, 27, 28, and 29 depicted by small circles during a short time interval of several symbol intervals. First through fourth dots 26', 27', 28', and 29' show the phase samples of the superposed signal described in conjunction with FIG. 2. It is now understood that the phase samples are spaced apart by the predetermined angle if attention is directed to the short time interval irrespective of the direct and the superposed signals.

Figure 6:
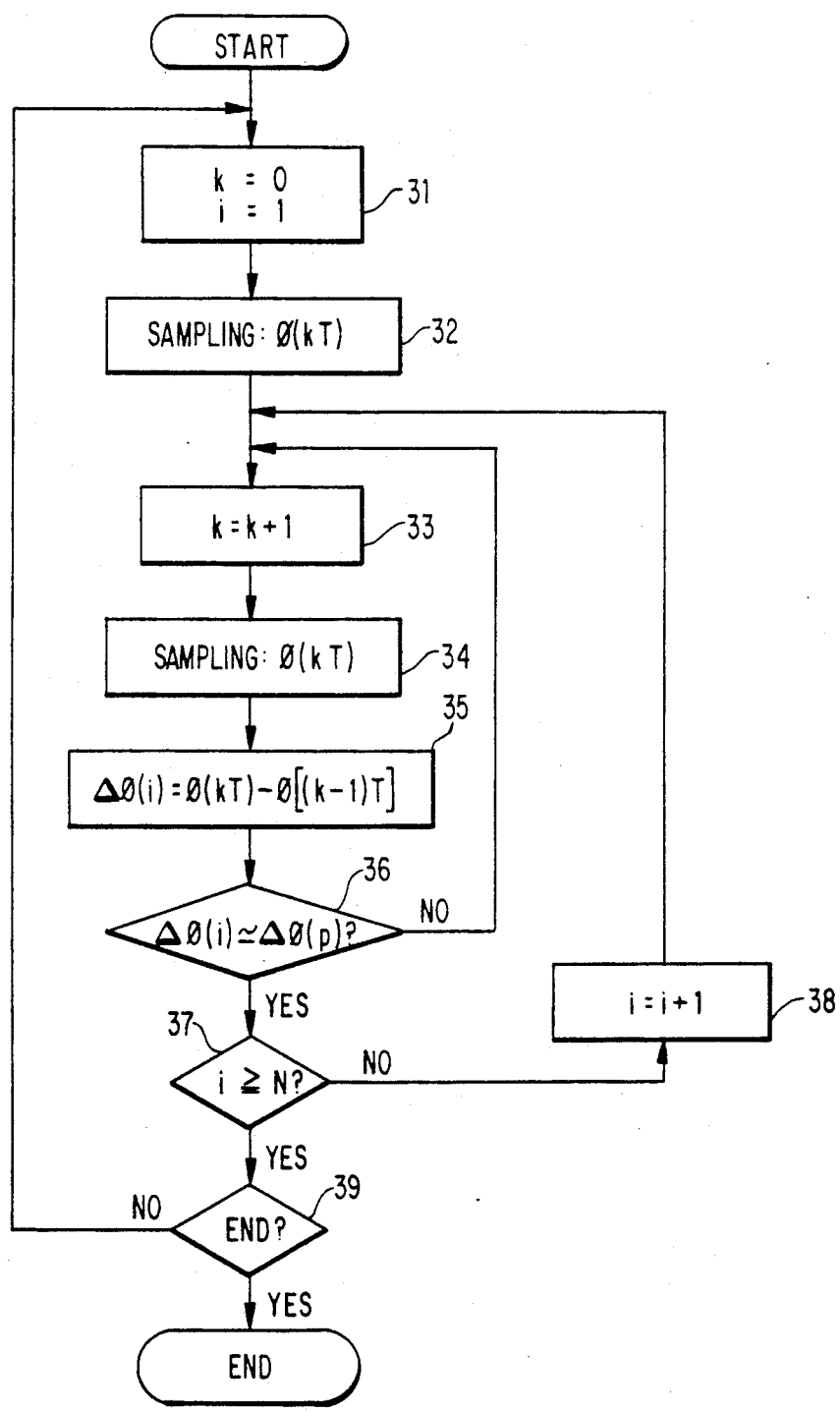
FIG. 6 shows a flow chart for use in describing a method according to an aspect of this invention.

Referring to FIG. 6, the description will proceed now to a method according to an aspect or a first embodiment of this invention. It should be noted that the method is for use in a receiver in detecting a particular signal sequence in a received signal when the received signal is produced for supply to the receiver by angular modulation of a modulating signal including symbols representative of binary one and zero at a predetermined symbol interval T and comprising a particular symbol pattern of a predetermined number N of symbols and when the particular signal sequence is the particular symbol pattern subjected to the angular modulation. On carrying out the method, the received signal is subjected to coherent detection. Inphase and quadrature phase analog signals are thereby produced to cooperatively define a signal vector which has a phase $\phi(t)$ variable in accordance with the modulating signal.

At a first step 31, a sample number k is given an initial value of zero. Furthermore, an instance number i is given a first value of 1. A clock signal is generated at a clock interval which is equal to the symbol interval T. The clock signal defines zeroth and other sampling instants kT. At a second step 32, the phase is sampled by using the clock signal representative of the zeroth sampling instant into a zeroth phase sample $\phi(O)$, which is depicted more in general as a k-th phase sample $\phi(kT)$. At a third step 33, one is added to the sample number k. At a fourth step 34, the phase is sampled by using the clock signal indicative of a first sampling instant into a first phase sample $\phi(T)$, which is again depicted as the k-th phase sample $\phi(kT)$. At a fifth step 35, the zeroth and the first phase samples, depicted in general as $\phi[(k-1)T]$ and $\phi(kT)$, are used in calculating a first calculated phase difference $\Delta\phi(1)$, which is depicted in general as $\Delta\phi(i)$. At a sixth step 36, the calculated phase difference is compared with a predetermined phase difference $\Delta\phi(p)$.

The predetermined phase difference should be equal to 90° and (−90°) when the symbols consecutively represent the binary one and the binary zero, respectively. The predetermined phase difference should be equal to 0° when the symbols alternatingly represent the binary one and zero.

If the calculated phase difference is not coincident with the predetermined phase difference, the sixth step 36 returns to the third step 33. Eventually, the calculated phase difference will become coincident with the predetermined phase difference. In this event, it is herein said that the calculated phase difference coincides with the predetermined phase difference in a first instance of coincidence. The instance number i represents how many times the calculated phase difference coincides with the predetermined phase difference. In other words, the instance number i represents the number of consecutive instances of coincidence of each calculated phase difference with the predetermined phase difference. The sixth step 36 now proceeds to a seventh step 37, at which the instance number i is compared with the predetermined number N.

If the instance number i is less than the predetermined number N, one is added to the instance number i at an eighth step 38. The third through the eighth steps 33 to 38 are repeated until the instance number i reaches the predetermined number N, when the particular symbol pattern is detected in a combination of the inphase and the quadrature phase analog signals.

In the manner exemplified before, the modulating signal may comprise a prescribed number of particular symbol patterns, which number and the symbol interval T are preliminarily known by an attendant to the receiver. Only when the particular symbol pattern is one in number, detection of the particular symbol pattern comes to an end. Judgement is therefore carried out at a ninth step 39 whether or not an end is reached on detecting the particular symbol pattern or patterns in the combination. If the end is not yet reached, the first through the ninth steps 31 to 39 are repeated. It should be noted that the predetermined number N should be selected at the seventh step 37 dependent on each of a plurality of particular symbol patterns. When detection of all particular symbol pattern is judged at the ninth step 39, the method comes to an end.

It is now understood in connection with the method described with reference to FIG. 6 that the phase of the signal vector is sampled at the sampling interval to produce the phase samples at the first through the fourth and the eighth steps 31 to 34 and 38. The calculated phase differences are calculated at the sampling interval, each between two consecutive ones of the phase samples, at the fifth and the eighth steps 35 and 38. Consecutive instances of coincidence of each of the calculated phase differences with the predetermined phase difference are detected at the sixth and the eighth steps 36 and 38. Presence of the particular signal sequence or sequences in the received signal is known at the seventh through the ninth steps 37 to 39.

Figure 7:
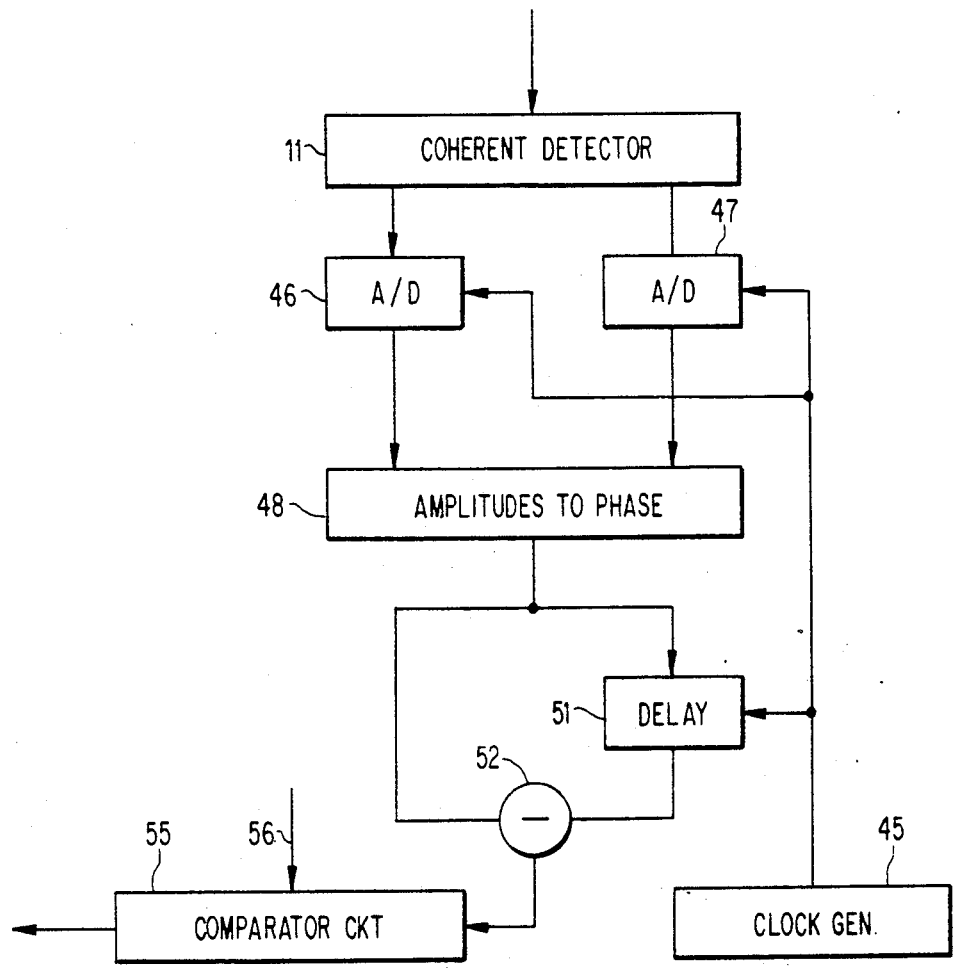
FIG. 7 is a block diagram of a device according to another aspect of this invention.

Referring to FIG. 7, the description will proceed to a device according to a different aspect or a second embodiment of this invention. It should be noted that the device is for use in a receiver in detecting a particular signal sequence in a received signal when the received signal is produced by angular modulation of a modulating signal including symbols representative of binary one and zero at a predetermined symbol interval T and comprising a predetermined number N of symbols as a particular symbol pattern and when the particular signal sequence is the particular symbol pattern subjected to the angular modulation.

The device comprises a coherent detector like the conventional device illustrated with reference to FIG. 1. The coherent detector is therefore designated by the reference numeral 11. Subjecting the received signal to coherent demodulation or detection, the coherent detector 11 produces inphase and quadrature phase analog signals cooperatively defining a signal vector which has a phase $\phi(t)$ variable in accordance with the modulating signal. It is therefore possible to say that the coherent detector 11 produces a vector signal representative of the signal vector.

A clock generator 45 generates a clock signal of a clock period or at a clock interval which is equal to the symbol interval T. First and second analog-to-digital converters (A/D) 46 and 47 are controlled by the clock signal and may collectively be referred to as a component converting arrangement. The first analog-to-digital converter 46 converts the inphase analog signal to a first or inphase digital signal having a first amplitude value which is variable at the clock interval. The second analog-to-digital converter 47 converts the quadrature phase analog signal to a second or quadrature phase digital signal representative of a second amplitude value variable at the clock interval.

An amplitude-to-phase converter 48 is supplied with the first and the second digital signals and converts a combination of the first and the second amplitude values to a phase sample at a time instant defined by each clock interval. The amplitude-to-phase converter 48 thereby produces a sample signal representative of phase samples which are sampled from the phase of the signal vector at the clock interval. In this manner, the clock interval is used as a sampling interval.

The amplitude-to-phase converter 48 therefore serves as a signal producing arrangement supplied with the first and the second digital signals for producing the sample signal by converting the combination of the first and the second amplitude values to each of the phase samples. In practice, a read-only memory (ROM) is used as the signal producing arrangement (48). The read-only memory is supplied, as an address or access signal, with a combination of the first and the second digital signals. The read-only memory thereby produces the sample signal.

A combination of the component converting arrangement (46 and 47) and the signal producing arrangement (48) serves as an overall converting arrangement supplied with the clock signal for converting the inphase and the quadrature phase analog signals to the first and the second digital signals in symchronism with the clock signal to produce the sample signal representative of the phase samples which the first and the second digital signals are cooperatively representative of. Another combination of the clock generator 45 and the overall converting arrangement (46 to 48) serves as a sampling arrangement supplied with the vector signal for sampling the phase of the signal vector at the sampling or clock interval to produce the sample signal.

In FIG. 7, a delay circuit 51 is supplied with the clock signal and the sample signal to give the phase samples a delay of one clock interval in common, to convert the phase samples to delayed samples, and to produce a delayed signal representative of the delayed samples. A subtracter 52 is supplied with the sample signal and the delayed signal to subtract one of the delayed samples from one of the phase samples that should be given the delay one clock interval later than the delayed sample under consideration. The subtracter 52 thereby calculates each of calculated phase differences and produces a difference signal representative of the calculated phase differences.

It is now understood that a combination of the delay circuit 51 and the subtracter 52 serves as a calculating arrangement supplied with the clock signal and the sample signal to calculate the calculated phase differences at the clock or sampling instant to produce the difference signal. Each calculated phase difference is calculated between two consecutive ones of the phase samples.

The difference signal is delivered to a comparator circuit 55 supplied through a signal supply lead 56 additionally with a "predetermined" signal representative of a predetermined phase difference. In the manner described before, the predetermined phase difference depends on the particular symbol pattern which the inphase and the quadrature phase analog signals comprise. The signal supply lead 56 should therefore be understood to represent a "predetermined" signal generating arrangement which is programmed to generate the predetermined signal selectively representative of the predetermined phase difference. Operation of the comparator circuit 55 will be described below.

Figure 8:
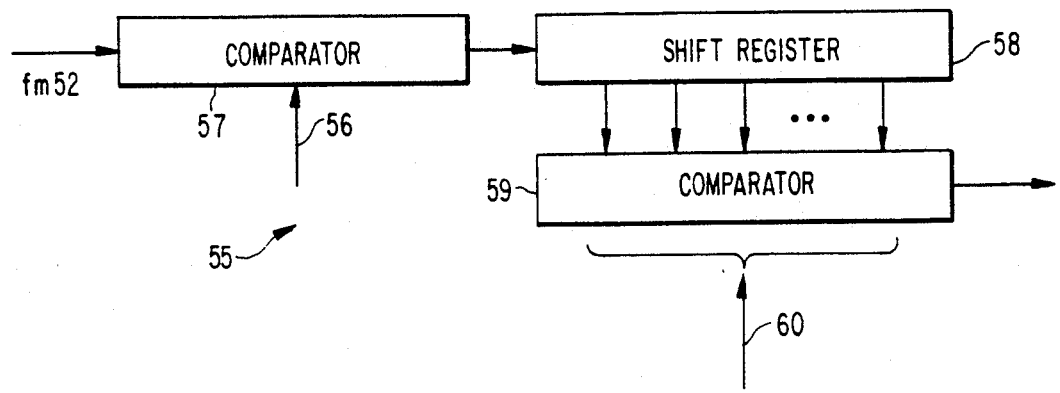
FIG. 8 is a block diagram of a comparator circuit for use in the device illustrated in FIG. 7.

Turning to FIG. 8, the comparator circuit 55 comprises an input comparator 57 supplied with the difference signal from the subtracter 52 and with the predetermined signal through the signal supply lead 56. The input comparator 57 detects an instance of coincidence of each calculated phase difference with the predetermined phase difference. The input comparator 57 therefore serves, in cooperation with the signal supply lead 56, as a detecting arrangement for detecting consecutive instances of coincidence of each of the calculated phase differences with the predetermined phase difference. The detecting arrangement (55 and 56) thereby produces a coincidence signal representative of the consecutive instances of coincidence. It will be assumed during a short while that the coincidence signal has a binary zero and a binary one level when each instance of coincidence is and is not detected, respectively.

A shift register 58 has as many stages as the predetermined number N. Serially supplied with the binary zero and one levels of the coincidence signal, the shift register 58 supplies an output comparator 59 with output signals of the respective stages in parallel. A determination signal is delivered to the output comparator 59 through a signal supply connection 60, which serves like the predetermined signal generating arrangement (56) as a determination signal generating arrangement to generate the determination signal with the binary zero levels of a number equal to the predetermined number N. The output comparator 59 compares the output signals of the shift register 58 with the determination signal. When the binary zero and/or one levels of the output signals are coincident with the determination signal, the output comparator 59 produces a result signal which indicates that the particular symbol pattern is found in a combination of the inphase and the quadrature phase analog signals and consequently that the particular signal sequence is present in the received signal.

It is now understood that a combination of the shift register 58, the output comparator 59, and the determination signal generating arrangement (60) serves as a determining arrangement supplied with the coincidence signal to determine presence of the particular signal sequence in the received signal. Presence of the particular signal sequence is determined when the instances of coincidence reach in number to the predetermined number N.

It should be noted in connection with the device illustrated with reference to FIGS. 7 and 8 that the instances of coincidence may become smaller in number than the predetermined number N when the receiver is used in a radio communication network and when at least one delayed signal is superposed on the direct signal. The predetermined number N should therefore be as great as possible, such as about fifty. The determination signal should have the binary zero levels which are about five less in number than the predetermined number N. Under the circumstances, the determining arrangement (58 to 60) can determine presence of the particular signal sequence when the instances of coincidence reach in number substantially to the predetermined number N.

It should furthermore be noted that a digital signal processor can be used instead of either a partial combination of the calculating arrangement (51 and 52), the detecting arrangement (56 and 57), and the determining arrangement (58 to 60) or another combination of the partial combination and the signal producing arrangement (48). When used instead of the last-mentioned combination, the digital signal processor carries out a modified method of (1) calculating the calculated phase diffrences, (2) detecting the consecutive instances of coincidence, and (3) knowing presence of the particular signal sequence in the received signal when the instances of coincidence reach in number substantially to the predetermined number N. The modified method is carried out with the coherent detector 11 made to subject the received signal to coherent detection to produce the inphase and the quadrature phase analog signals and with the clock generator 45 made to generate the clock signal at the clock interval which is equal to the symbol interval T.

Reviewing FIG. 5, it is understood that either the clock interval or the sampling interval may be a little different from the symbol interval T, namely, may have a difference of several percent from the symbol interval T. In other words, the method and the device are operable when either the clock or the sampling interval is substantially equal to the symbol interval T.

Similarly, the signal producing arrangement (56 and 57) may produce the coincidence signal when each calculated phase difference is substantially equal to the predetermined phase interval, namely, is several percent different from the predetermined phase difference. In the sixth step 36 of FIG. 6, this fact is depicted by a symbol indicative of nearly equal.

While this invention has thus far been described in specific conjunction with only two preferred embodiments thereof and in relation to a modification of the device, it will now be readily possible for one skilled in the art to put this invention into practice in various other manners. For example, the particular symbol pattern is not restricted to the examples given before but can be one that makes the signal vector have a phase variable at the symbol interval T in accordance with a predetermined rule. The above-given numerical examples should be empirically or otherwise changed depending on the circumstances.

What is claimed is:

1. A method of detecting a particular signal sequence in a received signal produced by angular modulation of a modulating signal including symbols representative of binary one and zero at a predetermined symbol interval and comprising a particular symbol pattern of a predetermined number of symbols, said particular signal sequence being the particular symbol pattern subjected to said angular modulation, said method comprising the steps of:

subjecting said received signal to coherent detection to produce a signal vector having a phase variable in accordance with said modulating signal;

sampling said phase at a sampling interval to produce phase samples, said sampling interval being substantially equal to said symbol interval;

calculating phase differences between two consecutive ones of said phase samples;

detecting consecutive instances of coincidence of each of said calculated phase differences substantially with a predetermined phase difference; and detecting the presence of said particular signal sequence in said received signal when said instances of coincidence reach in number substantially to said predetermined number.

2. A method as claimed in claim 1, wherein said particular symbol pattern consists of the symbols representative of a selected one of the binary one and zero.

3. A method as claimed in claim 1, wherein said particular symbol pattern consists of the symbols alternatingly representative of the binary one and zero.

4. A method of detecting a particular signal sequence in a received signal produced by angular modulation of a modulating signal including symbols representative of binary one and zero at a predetermined symbol interval and comprising a particular symbol pattern of a predetermined number of symbols, said particular signal sequence being the particular symbol pattern subjected to said angular modulation, said method comprising the steps of:

subjecting said received signal to coherent detection to produce an inphase and a quadrature phase analog signal which are cooperative to define a signal vector having a phase variable in accordance with said modulating signal;

generating a clock signal at a clock interval which is substantially equal to said symbol interval;

converting said inphase and said quadrature phase analog signals to first and second digital signals in synchronism with said clock signal, said first and said second digital signals cooperating to represent phase samples into which said phase is sampled at said clock interval;

calculating phase differences between two consecutive ones of said phase samples;

detecting consecutive instances of coincidence of each of said calculated phase differences substantially with a predetermined phase difference; and detecting the presence of said particular signal sequence in said received signal when said instances of coincidence reach in number substantially to said predetermined number.

5. A method as claimed in claim 4, wherein said particular symbol pattern consists of the symbols representative of a selected one of the binary one and zero.

6. A method as claimed in claim 4, wherein said particular symbol pattern consists of the symbols alternatingly representative of the binary one and zero.

7. A method as claimed in claim 4, wherein: said converting step comprises the steps of:

converting in synchronism with said clock signal said inphase analog signal to an inphase digital signal having a first amplitude value variable at said clock interval and said quadrature phase analog signal to a quadrature phase digital signal having a second amplitude value variable at said clock interval, said inphase and said quadrature phase digital signals being said first and said second digital signals; and converting said first and said second amplitude values successively to said phase samples;

said calculating step comprising the steps of:

giving said phase samples a delay of said clock interval in common to produce delayed samples; and calculating each of said phase differences by a difference between one of said delayed samples and one of said phase samples that should be given said delay one clock interval later than said one of the delayed samples.

8. A device for detecting a particular signal sequence in a received signal produced by angular modulation of a modulating signal including symbols representative of binary one and zero at a predetermined symbol interval and comprising a particular symbol pattern of a predetermined number of symbols, said particular signal sequence being the particular symbol pattern subjected to said angular modulation, said device being connected to a coherent detector for subjecting said received signal to coherent demodulation to produce a vector signal representative of a signal vector having a phase variable in accordance with said modulating signal, said device comprising:

sampling means supplied with said vector signal for sampling said phase at a sampling interval to produce a sample signal representative of phase samples, said sampling interval being substantially equal to said symbol interval;

calculating means response to said sample signal for calculating phase differences between two consecutive ones of said phase samples to produce a difference signal representative of said calculated phase differences;

detecting means supplied with said difference signal for detecting consecutive instances of coincidence of each of said calculated phase differences substantially with a predetermined phase difference to produce a coincidence signal representative of said instances of coincidence; and determining means supplied with said coincidence signal for determining presence of said particular signal sequence in said received signal when said instances of coincidence reach in number substantially to said predetermined number, said determining means thereby producing a result signal indicating that said particular signal sequence is present in said received signal.

9. A device as claimed in claim 8, wherein said particular symbol pattern consists of the symbols representative of a selected one of the binary one and zero.

10. A device as claimed in claim 8, wherein said particular symbol pattern consists of the symbols alternatingly representative of the binary one and zero.

11. A device for detecting a particular signal sequence in a received signal produced by angular modulation of a modulating signal including symbols representative of binary one and zero at a predetermined symbol interval and comprising a particular symbol pattern of a predetermined number of symbols, said particular signal sequence being the particular symbol pattern subjected to said angular modulation, said device comprising:
- a coherent detector for subjecting said received signal to coherent demodulation to produce an inphase and a quadrature phase analog signal which are cooperative to define a signal vector having a phase variable in accordance with said modulating signal;
- a clock generator for generating a clock signal at a clock interval which is substantially equal to said symbol interval;
- converting means supplied with said clock signal for converting said inphase and said quadrature phase analog signals to first and second digital signals in synchronism with said clock signal to produce a sample signal representative of phase samples which said first and said second digital signals are cooperatively representative of;
- calculating means responsive to said clock signal and said sample signal for calculating phase differences between two consecutive ones of said phase samples to produce a difference signal representative of said calculated phase differences;
- detecting means supplied with said difference signal for detecting consecutive instances of coincidence of each of said calculated phase differences substantially with a predetermined phase difference to produce a coincidence signal representative of said instances of coincidence; and
- determining means supplied with said coincidence signal for determining presence of said particular signal sequence in said received signal when said instances of coincidence reach in number substantially to said predetermined number.

12. A device as claimed in claim 11, wherein said particular symbol pattern consists of the symbols representative of a selected one of the binary one and zero.

13. A device as claimed in claim 11, wherein said particular symbol pattern consists of the symbols alternatingly representative of the binary one and zero.

14. A device as claimed in claim 11, wherein:
said converting means comprises:
- component converting means supplied with said clock signal for converting said inphase analog signal to an inphase digital signal having a first amplitude value variable at said clock interval and said quadrature phase analog signal to a quadrature phase digital signal having a second amplitude value variable at said clock interval, said inphase and said quadrature phase digital signals being said first and said second digital signals; and
- signal producing means supplied with said inphase and said quadrature phase digital signals for producing said sample signal by converting a combination of said first and said second amplitude values to each of said phase samples at a time instant defined by said clock interval;

said calculating means comprising:
- a delay circuit supplied with said clock signal and said sample signal for giving said phase samples a delay of said clock interval in common to produce delayed samples and a delayed signal representative of said delayed samples; and
- a substracter supplied with said sample signal and said delayed signal for calculating a difference between one of said delayed samples and one of said phase samples that should be given said delay one clock interval later than said one of the delayed samples, said subtracter thereby calculating each of said calculated phase differences to produce said difference signal.

15. A device as claimed in claim 14, wherein:
said component converting means comprises:
- a first analog-to-digital converter for converting said inphase analog signal to said inphase digital signal to make said inphase digital signal represent said first amplitude value; and
- a second analog-to-digital converter for converting said quadrature phase analog signal to said quadrature phase digital signal to make said quadrature phase digital signal represent said second amplitude value;

said signal producing means being a read-only memory supplied with a combination of said inphase and said quadrature phase digital signals as an address signal to produce said sample signal.

* * * * *